(12) United States Patent
Addie et al.

(10) Patent No.: US 6,450,023 B1
(45) Date of Patent: Sep. 17, 2002

(54) METHOD AND APPARATUS FOR AIR TESTING PUMPS

(75) Inventors: Graeme Addie, Grovetown, GA (US); Peter Hergt, Ludwigshafen/Rhein (DE)

(73) Assignee: GIW Industries, Inc., Grovetown, GA (US)

( * ) Notice: Subject to any disclaimer, the term of this patent is extended or adjusted under 35 U.S.C. 154(b) by 59 days.

(21) Appl. No.: 09/634,872

(22) Filed: Aug. 7, 2000

(51) Int. Cl.[7] ............................................. G01M 19/00
(52) U.S. Cl. ..................................... 73/168; 73/861.69
(58) Field of Search ........................... 417/63; 73/168, 73/1.01; 415/206

(56) References Cited

U.S. PATENT DOCUMENTS

| | | | | |
|---|---|---|---|---|
| 4,088,017 A | * | 5/1978 | Olges | 73/168 |
| 4,335,994 A | * | 6/1982 | Gurth | 415/90 |
| 4,478,336 A | * | 10/1984 | Thompson | 209/588 |
| 4,872,809 A | * | 10/1989 | Addie et al. | 415/206 |
| 4,923,369 A | * | 5/1990 | Addie et al. | 415/206 |
| 5,078,009 A | * | 1/1992 | Lefebvre | 73/168 |
| 5,129,264 A | * | 7/1992 | Lorenc | 73/861.42 |
| 5,219,271 A | * | 6/1993 | Nachtrieb | 415/206 |
| 5,813,833 A | * | 9/1998 | Addie et al. | 415/206 |
| 6,053,698 A | * | 4/2000 | Hergt et al. | 415/206 |

* cited by examiner

*Primary Examiner*—Hezron Williams
*Assistant Examiner*—Rodney T. Frank
(74) *Attorney, Agent, or Firm*—Crowell & Moring LLP (57) ABSTRACT

A method and apparatus for determining the efficiency of a liquid pump using air as a test medium. The method includes determining the total power output of the pump operated on air and determining the input power necessary to operate the pump on air. The input power is corrected for power differences resulting from operation of the pump on air rather than a liquid to obtain a corrected power input. The corrected power input is then divided into the power output to determine pump efficiency. The apparatus for performing the method includes a liquid pump arrangement temporarily connected to a bearing arrangement. The bearing arrangement is designed to support only the static load of the pump and the dynamic loads generated by operating the pump on air. This allows a bearing housing to be used that is smaller in size and less expensive to use. In addition, because the pump is operated on air, the components for feeding the air are less expensive as is the medium itself.

14 Claims, 5 Drawing Sheets

Losses versus specific speed for different designs of double-suction pumps

METHOD AND APPARATUS FOR AIR TESTING PUMPS

BACKGROUND AND SUMMARY OF THE INVENTION

The present invention is directed to a method and apparatus for centrifugal testing pumps, and more particularly, a method and apparatus for determining pumping efficiency of large quantity centrifugal slurry pumps using air as a test medium to predict pump performance and efficiency. The use of air as a testing medium requires less power to operate the pump, and a open test loop consisting of a light construction flow tube, section pipe and discharge pipe sections making for a simpler, less costly, easier to use test rig.

Centrifugal slurry pumps are large quantity pumps, such as large dredge pumps, for moving a large volume of solid-liquid mixture. As described, for example, in Applicants commonly assigned U.S. Pat. No. 4,923,369, which issued May 8, 1990, a centrifugal-type pump consists basically of a rotatable impeller enclosed by a collector or shell. As the impeller is rotated, it generates velocity head at the periphery of the shell. The shell collects the velocity head and converts it to a pressure head. There are many configurations within the framework of this basic design. In one common configuration illustrated in FIG. 1, the flow enters the shell on one side along the axis of rotation of the impeller, that is, the flow enters the shell at a point adjacent to the center of the impeller, referred to as the "eye" of the impeller, while the discharge of the shell is located at a point tangent to the shell outer periphery.

Figure 1:
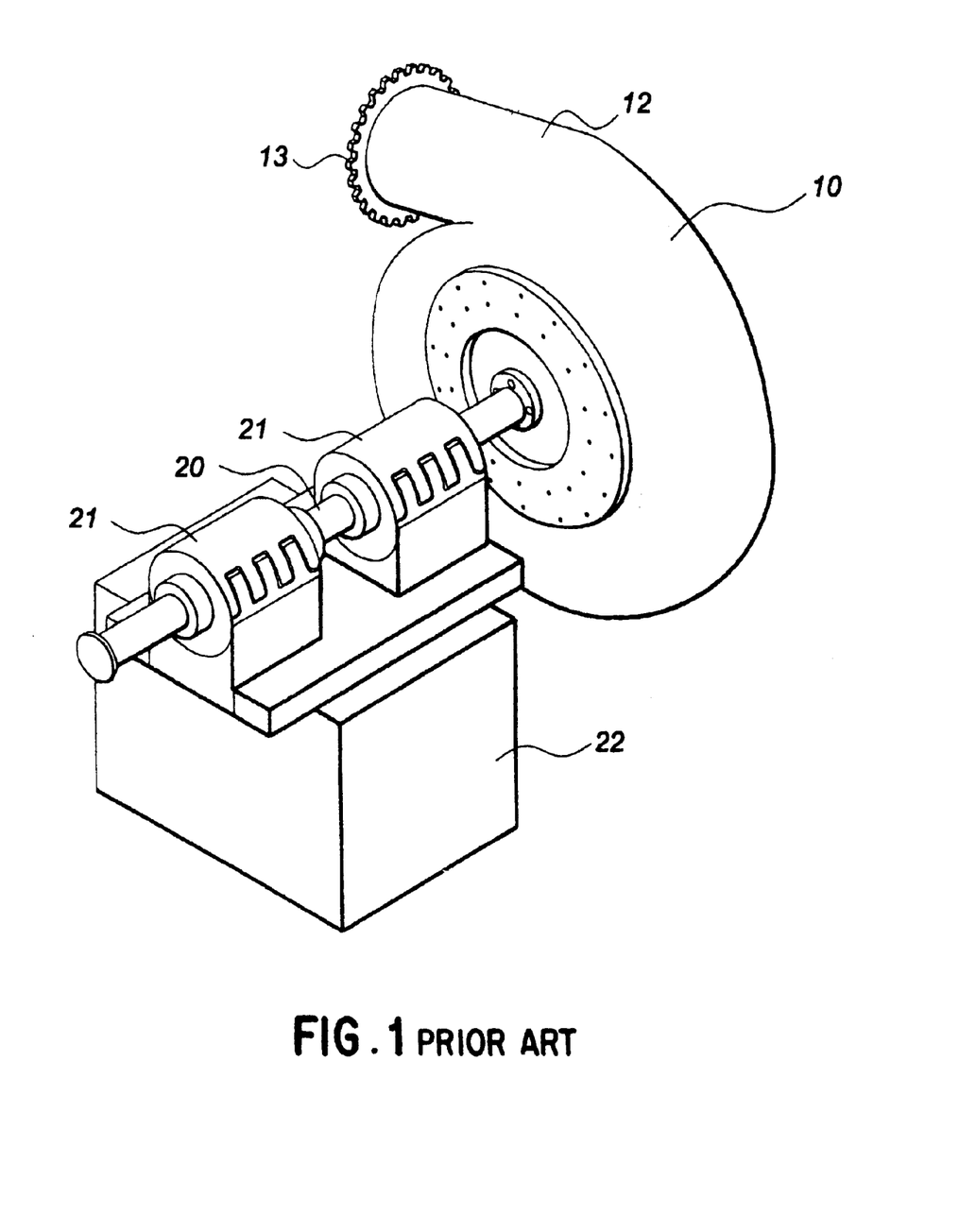
FIG. 1 is a perspective view of a typical pump arrangement that is the subject of the present invention.

The impeller is connected to a drive shaft 20, which protrudes away from the shell and is rotatably supported by suitable bearings blocks 21. A motor (not shown) rotates the shaft 20 and the impeller within shell. The usual packing (not shown) for surrounding shaft 20 in the central portion of the back side of the shell, prevents leakage.

Figure 2:
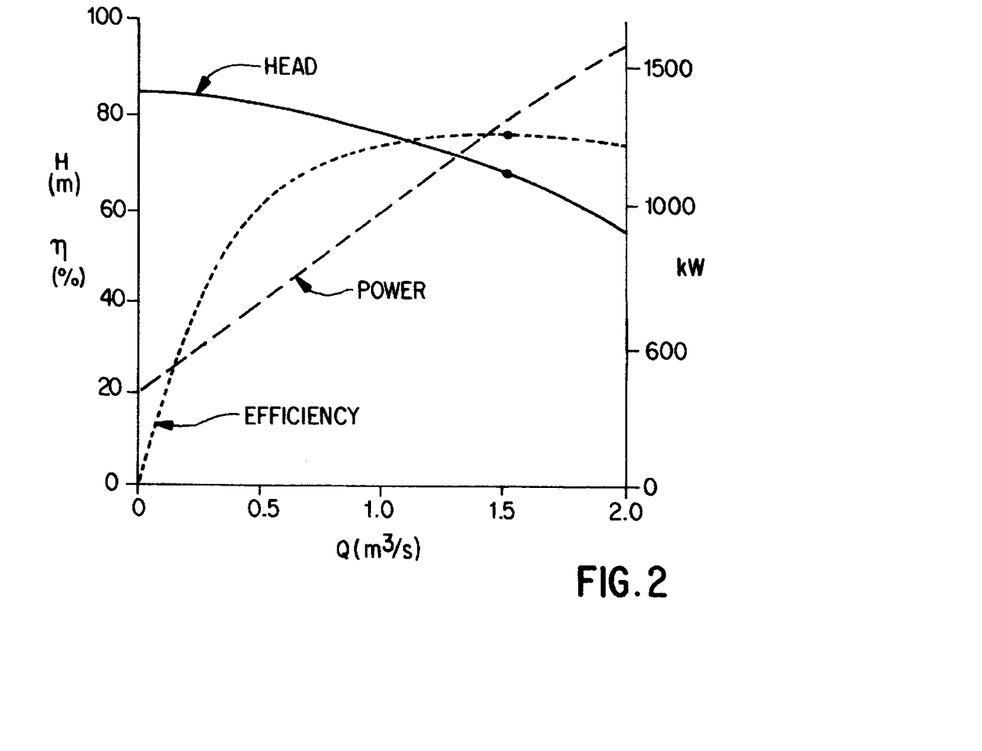
FIG. 2 is a graph illustrating pump characteristic curves.

The efficiency and performance of a centrifugal slurry pump is normally determined by pumping water around a test loop and recording the differential head across the pump, the flow through the pump and the pump input power. The head and power at constant rotational speed (rpm) varies with the flow as shown in FIG. 2. Head quantity performance at constant rpm has a characteristic curve that is usually established from ten or so sets of head measurements at different flows.

To determine performance of the pump, calculations for head and efficiency are made. The volume of liquid pumped is referred to as capacity and is generally measured in liters per second. The height to which liquid can be raised by a centrifugal pump is called total dynamic head (TDH) and is measured in meters. This does not depend on the nature of the liquid (its specific gravity) so long as the liquid viscosity is not higher than that of water. Water performance of centrifugal pumps is used as a standard of comparison because practically all commercial testing of pumps is done with water.

The head (H), or TDH as it is commonly called, is determined from the differential pressure across the pump and with appropriate velocity head and datum corrections using the well known Bernoulli's Equation 1:

$$H = TDH = \frac{V_B^2 - V_A^2}{2g} + \frac{P_B - P_A}{\rho_f g} + (z_B - z_A) \quad (1)$$

where
- TDH is usually in meters of $H_2O$
- V is usually in meters/sec.
- P is usually in Newton/meters squared (or Pascal)
- $\rho$ is the density of water in $kg/m^3$
- g is 9.81 meters/second squared
- z is in meters of $H_2O$.

The performance shown in FIG. 2 varies with speed according to well-established laws, which may be used to establish the hydraulic performance of the pump at other speeds. When testing a pump, it is normal to test at or near the expected pump operating speed. The following discussing will be limited to constant speed.

The power output of the pump is determined by the product of Q, which represents the quantity of fluid pumped ($m^3$/sec) and H, and is given by:

$$(Power)_{out} = \rho g Q H \quad (2)$$

This relation applies in any consistent system of units. Thus for SI units, equation (2) gives the power out in watts, which is usually divided by 1000 to obtain kilowatts. In the units in common use in the United States, Q is expressed in US gallons per minute, and H in feet and a numerical coefficient is required in the equation.

The input power to the pump can be defined as $(T)(\omega)$, where T is the torque on the shaft of the pump and $\omega$ is the angular velocity. Using seconds as the unit of time, $\omega$ is equal to $2\Pi n$ where n is measured revolutions per second. In practice, the speed of rotation is usually measured in revolutions per minute, even where SI units are generally employed. The symbol N (or rpm) will be reserved for revolutions per minute, and thus:

$$\omega = 2\Pi n = 2\Pi N/60 \quad (3)$$

and the input power is then defined as:

$$(Power)in = 2\pi n T = 2\pi \left(\frac{NT}{60}\right) \quad (4)$$

With torque in Newton-meters, this equation gives power in watts. In the United States, torque is generally measured in foot-pounds, and the input power is known, for historic reasons, as brake horsepower. When defined in this manner, a further numerical coefficient is required.

A final point, and in fact the main point concerning the pump's input and output, is pump efficiency, denoted $\eta$, which is the ratio of output power to input power, i.e.;

$$\eta = \frac{(Power)_{out}}{(Power)_{in}} \quad (5)$$

This relation applies in any system of units. For ideal pump efficiency, $\eta$ is 1.00 or 100%. However, in practice, pumps necessarily have lower values. Efficiencies of over 90% can be achieved for large water pumps. Efficiencies of slurry pumps tend to be somewhat less.

The resulting measured efficiency of a normal slurry pump (at constant speed) has a characteristic (curve) as shown in FIG. 2. The highest value along the curve is usually called the Best Efficiency Point Efficiency (BEPE) and the flow (Q) and head (H) corresponding to the BEPE are referred to as the BEPQ and BEPH, respectively. The theoretical head of a centrifugal pump may be defined as:

$$H_t = [u_2 c_{t2} - u_1 c_{t1}]/g \quad (6)$$

where u is the tangential velocity; and $c_t$ the tangential component of the absolute flow velocity.

As losses have been disregarded, H is a theoretical head.

Equation (6) is often called the Euler equation, after its originator (Euler, 1756). The term $u_1 c_{t1}$ refers to the flow entering the eye of the impeller. At the best efficiency point this term effectively reduces to zero. Thus it is ignored when considering the idealized machine with efficiency of 100%. The vector diagram at the exit of the impeller shows that:

$$c_{2t} = u_2 - c_{m2} \cot \beta_f \tag{7}$$

where $\beta_f$ is the angle between the relative velocity vector and the circumferential direction. It is somewhat smaller than the vane outlet angle. The term $c_{m2}$ is the meridional component of outlet velocity (directed radially outward for most slurry pumps), which in turn is given by the discharge Q divided by the exit area of the impeller, i.e.:

$$c_{m2} = \frac{Q}{\pi D_2 b_2} \tag{8}$$

where $b_2$ is the breadth between the shrouds at the outlet of the impeller.

All of the above are in terms of a fluid being pumped. Normally, this is thought of as some type of liquid as the fluid, or even air, noting then that the head produced value must also be in units of air. Centrifugal water and slurry pumps have been run on air. Provided the Reynolds (Re) number is high enough ($>10^5$), the head quantity performance data based on air as the flow medium has been found to be identical (within a normal commercial testing code tolerance) with that obtained on water. Recent tests carried out at the inventor's test laboratory on a pump with an impeller diameter of 1.58 meters, for example, show that separate water and air tested head quantity values were within 1% of each other.

If a large slurry pump could have performance and efficiency tests carried out using air rather than a liquid, with sufficient accuracy, establishing pump performance could be done much easier and with less expense. The power necessary to perform the tests with air rather than a liquid such as water is reduced by the ratio of the density of water to air, i.e.; about 1/800th of the power when pumping on air rather than on water. This is because the fluid being pumped can be drawn from the surrounding atmosphere requiring less pipe work. Due to the significant reduction in generated pressures, the pump plate and piping components can be made lighter and less expensively.

However, performing tests with air requires extra precautions in order to obtain accurate head quantity measurements. The pressures used during such tests are also about 1/800th or so what would be normal as when using water. Thus, highly accurate pressure measurements must be taken, and the method of flow measurement requires a suitably constructed venturi meter with high physical accuracy calibrated for the corresponding Re-range.

Figure 3:
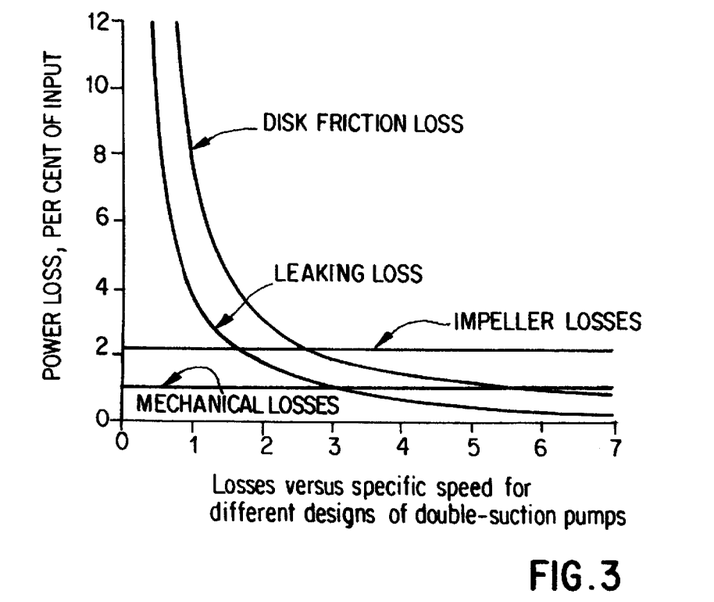
FIG. 3 is a graph illustrating different losses versus specific speeds for a typical double-suction pump.

While it is possible to test a pump using air and have this accurately predict the head quantity performance on water, the same is not necessarily true for obtaining an accurate prediction of pump efficiency. There are limitations associated with predicting pump efficiency using air. One problem associated with air testing is that while the different disk friction, impeller and leakage losses remain proportionally the same within the same physical components, the mechanical losses in the form of the bearing housing mechanical losses do not similarly scale with the change in pumping fluid. In other words, while all of the disk friction losses scale with the power out performance, the mechanical losses stay roughly the same. A plot of typical losses is shown in FIG. 3 which includes different centrifugal pump losses as a percent of input when pumping water. The specific speed, $N_s$, in FIG. 3, is a hydraulic number describing the design of a pump which is equal to:

$$\frac{N \sqrt{BEPQ}}{BEPH^{0.75}} \tag{9}$$

where BEPQ is the flow in GPM corresponding to the Best Efficiency Point Efficiency, and BEPH is the head in feet corresponding to the Best Efficiency Point Efficiency.

It can be shown that the bearing housing losses when pumping water represent about 1% of the total power input to a centrifugal water pump. Tests, for example, on a 1.58 meter diameter impeller pump in the inventor's test lab showed 1.03% of the power input was consumed by the bearing housing.

The resisting rotating torque of a normal bearing housing comprises the resistance of the bearings together with resistance of any seals. It can he shown that with most bearings, the resistance changes very little, with load being mostly dependent on the size of the bearings (and any seal), the temperature (and type) of the lubricant and the rotating speed.

The bearing houses for centrifugal slurry pumps are large, cumbersome units designed to support the heavy weight of the impeller and shell as well as the hydro-dynamical forces associated with pumping large quantities of slurry. When using air and the same bearing housing while running at the same speed, the hydraulic load is dramatically different than when using a liquid. However, the bearing housing losses remain roughly the same provided the temperature, lubricant type, speed, etc. are the same and assuming the bearings are designed to carry the radial and thrust loads directly.

In theory it would be possible to make an impeller that weighed about $1/800^{th}$ of the original impeller and then design a special bearing housing for this weight and the air pumping loads. In practice, this is neither possible nor desirable so what remains is a bearing housing that is larger proportionally than that used in a water test.

On a 1000 kW input power pump, the normal pump bearing housing losses on water would be about 10 kW or 1%. The same pump with the same bearing housing, while pumping air, would require about $$\frac{1000 - 10}{830} + 10 = 11.19 \text{ kW}$$

where 830 is the approximate relative density ratio of air to water and where the bearing housing losses are now, $$\frac{10}{11.19} = 89\%$$

of the total power.

Although it was previously mentioned that the bearing housing losses for air and water are roughly constant, they do, in fact, vary by about 1–1.5% depending on the temperature of the lubricant, etc. While this has a negligible effect on the performance of a pump being tested on water, its effect on the performance of a pump being tested an air is very significant. If, for example, the 10 kW value above becomes 15 kW, then the total power above on air would become 16.19 kW and the proportion of power absorbed by the bearing housing becomes 93%.

The mechanical losses in an air test are a disproportionately large portion of the losses on a pump and, as a consequence of that, with any small variation in them, it is not possible to calculate the pump efficiency with the required accuracy. In theory, it would be possible to reduce the size of the bearing housing for an air test on the basis of the reduction in input power. Unfortunately, as noted earlier, it is not normally possible or practical to reduce the weight of the impeller in the same ratio. As such, it is not possible or practical to manufacture a bearing housing for an air test that has a normal portion of losses. Different bearing housing temperatures result in variations in bearing housing torque which, on water, are negligible, but in an air test would at least cause a problem with test repeatability.

The present invention is directed to solving the problems described above with respect to air testing slurry pumps to predict performance and efficiency. According to the present invention, a test method and apparatus is disclosed to test a slurry pump using air as a test medium. The use of air as a test medium according to the present invention substantially reduces the costs associated with testing the pump, while ensuring an accurate prediction of pump efficiency in its intended operating environment.

Accordingly, one aspect of the present invention is directed to a method for determining pump efficiency using air as a test medium in place of a liquid. According to the method, an impeller test is performed wherein air is introduced into a pump having an impeller and a drive shaft axially mounted within a shell. The impeller test is performed at a substantially constant speed over a range of flows from zero to approximately 130% of the expected BEPQ flow for the pump to obtain the total torque values represented by the total power, or $P_{tot}$. Thereafter, the impeller is removed and the bearing house power losses are calculated using a dummy weight to simulate the weight of the impeller at the same speed used during the impeller test to obtain the total power loss associated with the bearing housing, or $P_{brg}$. The power loss associated with the bearing housing, $P_{brg}$, is then subtracted from the total power, $P_{tot}$, and the difference is multiplied by 1.01, which represents adding back into the equation the normal bearing housing power and stuffing box losses associated with water. The result is a corrected total input shaft power, or $P_{cor}$. Pump efficiency, η, is then calculated based on the total power output ($P_{out}$) divided by the corrected total power input ($P_{cor}$). The pump efficiency figure obtained by this method provides an accurate prediction of pump efficiency within normal pump testing code.

According to another aspect of the present invention, an apparatus is disclosed for measuring pump efficiency using air as a test medium in place of water to save on costs associated with testing the pump. The apparatus includes a bearing housing for supporting an impeller drive shaft for a pump. The bearing housing is designed to support the normal weight of the structural parts of the pump but only a small fraction of the normal hydrodynamic force associated with the pump in normal operating conditions when pumping a fluid because air is being used as the pumping medium rather than a fluid. The apparatus further includes a torque measuring device and a variable speed motor. The bearings are small ball or roller bearings designed to support a smaller load than normal bearings used in the pump during normal operation. The use of smaller, constant friction bearings reduces the amount of power absorbed by the bearing housing. Because temperature of the bearing housing effects the torque required to rotate the drive shaft, a heating device is also included to heat and maintain the bearing housing at a relatively constant temperature.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

The invention will be better understood and objects other than those set forth above will become apparent when consideration is given to the following detailed description thereof which makes reference to the annexed drawings wherein.

DETAILED DESCRIPTION OF THE PREFERRED EMBODIMENT

The following is a brief description of the fundamental processes for determining pump efficiency using air as a test medium rather than a fluid. As described above, one aspect of the present invention is a method for determining the efficiency of a pump using air as a test medium. In the past, such testing was not feasible due to structural limitations on the pumping assembly in view of the density difference between air and water, the normal testing medium. According to the present invention, the method includes setting up a pump apparatus with a specialized test bearing housing designed to support the pump impeller and shaft and a fraction of the hydrodynamic force associated with pumping a liquid medium. Since the pumping medium for the testing method is air rather than a liquid, such as water, a much smaller and less costly bearing housing is required. By using air rather than a liquid as the test medium, it is also much easier to supply the fluid to the pump being tested. This leads to a tremendous savings in cost, space requirements and equipment.

After the pump and bearing housing are set up, an impeller test is run. The impeller test includes actuating the pump so that a motor rotates the impeller shaft, thereby driving the impeller within the pump to draw air into the shell. The torque required to rotate the impeller shaft throughout the test is monitored by a torque measuring device, such as a torque bar. The test can be carried out to collect total torque values of power, $P_{tot}$, using the normal impeller, casing and other components of the pump in air using a V-belt or other driver with a Lebow or other type of accurate measuring strain gauge-type torque bar sized to just transmit the total torque values of power. For example, the torque bar could be sized so that it reads at no less than half scale or 250 or so micro-strain. In the case of a test carried out on a 2.79 meter diameter pump this turns out to be a 38 mm diameter torque bar. The test should be run at a constant speed as for a normal water test, over a range of flows from zero flow up to approximately 130% of the expected BFPQ flow. The above test values should be collected or taken only after a constant bearing housing heated temperature of, for example, 80° C. has been achieved. Heating can be accomplished through the use of a heating device for controlling the temperature of the bearings to within 1–2° C. The result of the impeller test will be the total torque values of power that is designated $P_{tot}$, which represents the input power needed to drive the impeller using air as the medium.

After the impeller test has been carried out, a separate bearing housing test is carried out to determine the non-hydraulic mechanical losses of the bearing housing. In this so called calibration procedure, the impeller is removed from the pump. The test is run at the same speed as the impeller test with the bearings heated to the same temperature as a hydraulic test. The lubrication (level or other) should be the same.

Figure 6:
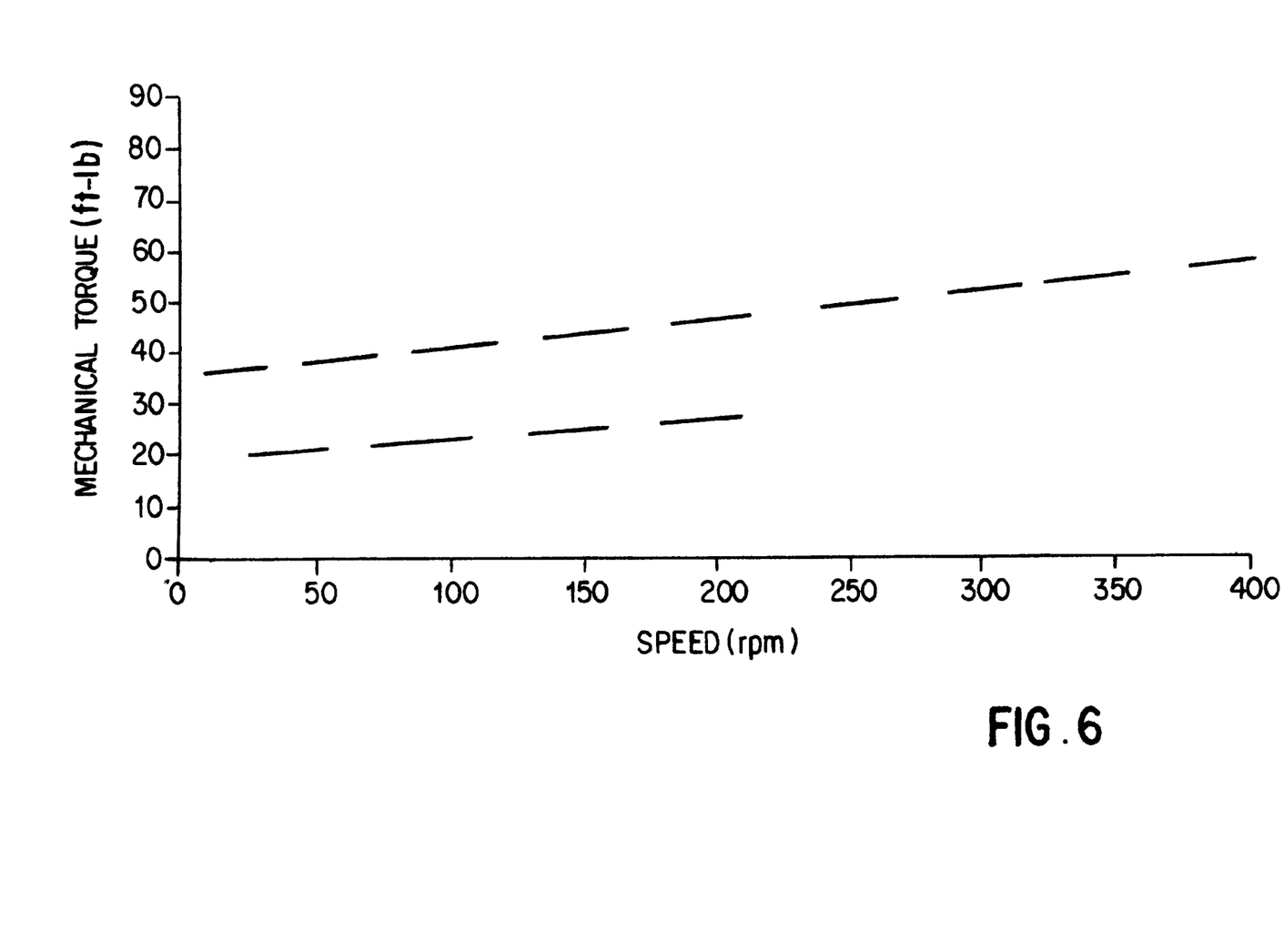
FIG. 6 illustrates results of mechanical loss calibration tests for a bearing housing with different weights.

The so called bearing housing mechanical loss calibrating tests should ideally be carried out at a number of different speeds and with a number of different weights so that data can be available for tests of different pumps running at different speeds. FIG. 6 shows data for an air test bearing housing with a 1300 lbs weight as well a other smaller weights of approximately 300 lbs.

For the bearing house test, a smaller torque-measuring bar should be used and sized to operate at no less than half full scale. In the case of a test carried out, a 25 mm diameter test bar was found to be satisfactory. For this test, a dummy weight designed to simulate part or all of the impeller weight was added to the shaft and a check was made that the friction does not vary by any measurable amount with different bearing housing radial load(s). The pump is operated in the same manner as noted above, and power losses associated with the bearing housing are observed and tabulated to obtain the bearing housing power loss, designated $P_{brg}$.

The above torque sensor size and minimum bearing housing size limitations are such that the method described herein is preferably used on large pumps, for example, pumps with impellers of 1.5 meters or larger and/or drawing 750 kW in service on water.

The size of the motor used in each of the above tests should be minimized in order to protect the torque measuring devices. However, the motor must be large enough to be able to overcome the higher startup torque observed when the bearing housing is cold. Minimization of the motor size may require that helping the motor start by rotating the impeller, for example, by hand or by some other peripheral device prior to or during startup. The use of a variable frequency drive was found to be advantageous for the 1.5 mm impeller.

In the case of a large slurry pump, which by its nature runs relatively slowly, this test arrangement should reduce the proportion of the mechanical losses to about 20% of the total output power at the BEPQ and provide readings repeatable within 1%.

In a further aspect of the inventive method, the bearing housing power $P_{brg}$ is subtracted from the total power with the impeller installed ($P_{tot}$). The result is then multiplied by 1.01 to add back the normal bearing housing power and stuffing box losses on water, as shown below:

$$P_{cor} = (P_{tot} - P_{brg}) \times 1.01$$

$P_{cor}$ reflects the corrected total shaft input power for the pump operated on air. After the corrected input power is determined, the pump efficiency, designated , can be calculated as follows:

$$\eta = \frac{P_{out}}{P_{cor}}$$

If carried out carefully, the above procedures provide efficiency values (within normal commercial pump test code) that are the same as the values obtained using water as the test medium.

Figure 4:
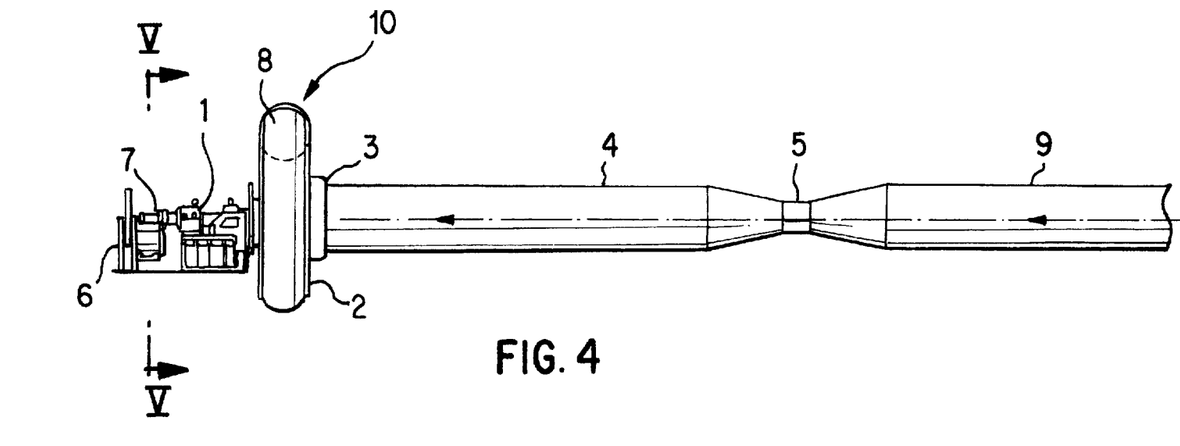
FIG. 4 is a side view of a pump and bearing arrangement according to the present invention.
Figure 5:
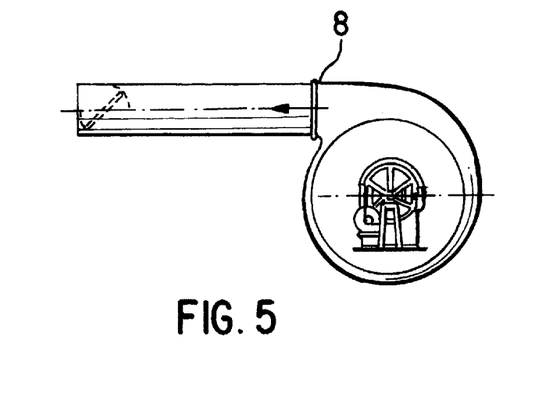
FIG. 5 is an end view of a pump and bearing arrangement of the present invention.
Figure 7:
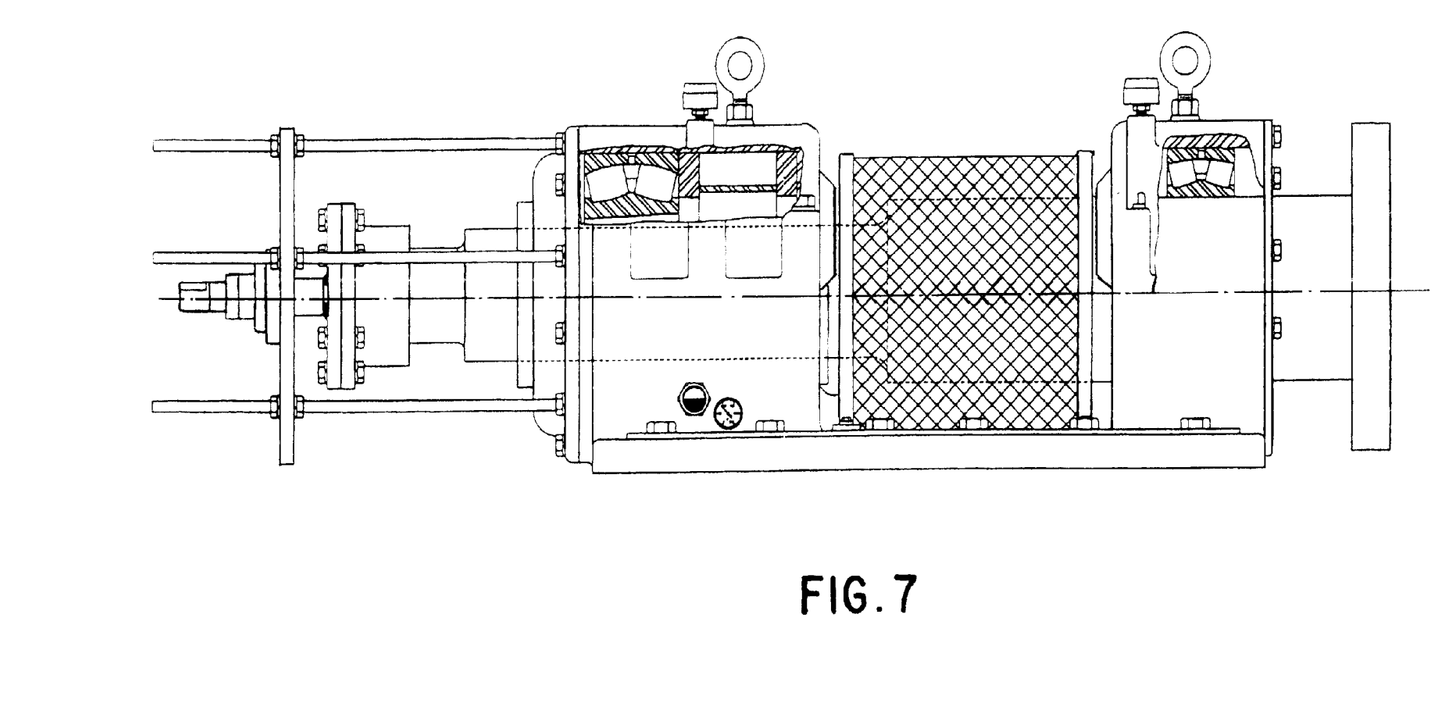
FIG. 7 shows a bearing housing set up for air testing.

According to another aspect of the present invention, a bearing arrangement is contemplated that allows for a large pump to be tested in a less costly manner. According to this aspect of the invention, as illustrated in FIG. 4, a pump 10 includes a bearing apparatus 1. Bearing apparatus 1 includes a bearing housing, inside of which is maintained special (small) ball and/or roller bearings. The roller bearings are designed to carry the static loads on the pump when being tested using air. This arrangement allows for the bearings to be significantly smaller than standard bearings since the dynamic load from air is significantly less than the dynamic load from water. The bearings also need only be designed for a thirty (30) test cycle. This construction significantly reduces the proportion of power absorbed by the bearing housing and also reduces the costs associated with building the bearing housing. A heating unit is also provided to heat the bearing housing to a specified temperature and to maintain the temperature during the test cycle. A control unit, such as a stand alone computer or some other type of processing unit is provided to store measured values associated with the pump. FIG. 7 illustrates a bearing housing set up for air testing with impeller size from about 62 inches to 115 inches in diameter.

Tests have shown that a normal bearing housing consisting of three anti-friction bearings can not be used for an air test. A normal bearing housing contains two anti-friction double row spherical roller bearings front and rear, with a third spherical thrust bearing. This is because for the physical size required of the bearings to be able to carry the impeller weight, the hydraulic axial load is insufficiently small to overcome the thrust bearing internal spring ring load. Fox example, in a 2.79 meter diameter impeller tested by the inventor, the spring ring load was about 16,000N while the axial load varied around 3000N. The varying axial load in an air test causes the bearing housing friction torque to vary unpredictably. Even though the axial load is relatively small, removing the spherical thrust bearing and using the double row spherical roller bearings to carry the load is unacceptable also because their friction varies slightly with the axial load. While this would be insignificant in a water test it is a significant variable in an air test.

The bearings in this case must be of a type wherein the friction does not change with either a radial or small axial load. A housing with a ball thrust bearing and ball or roller radial bearing is ideal. An anti-friction type bearing housing with the same characteristics would be acceptable also.

The bearing housing of FIG. 7 has been modified so that the double row spherical roller bearing carries no thrust as tests have shown that the frication or resisting torque of these bearings varies unpredictably with axial load. This modification is achieved by the installation of a small single groove ball bearing mounted separately in such a way as to carry only thrust loads.

The bearing housing should have no rubbing seals and have provision for lubrication that is constant either by a constant oil level and/or grease that is allowed to find its own path away from the bearing. Tests have shown that the torque required to rotate the mechanical end of the shaft varies significantly with bearing temperature and on its own is less than half when up to steady-state running temperature compared to that of a cold bearing housing. As such, provision should be made for heating the bearing housing and controlling the temperature of the bearings within 1° C.

As indicated previously, the sizing of the bearing housing is such that it can adequately carry the static weight of the impeller (which is 95% of the total load) and to have additional capacity for the expected dynamic out-of-balance load and the hydraulic axial and radial air loads. During the test, the hydraulic axial and radial air loads will change and this change could cause a change in the bearing housing friction. In reality these loads are small compared to the weight loads in which case a change in these loads will result in a very small change in bearing housing friction and consequently only a small error associated with the constant deduction shown in FIG. 6.

The centrifugal out-of-balance force of the heavy impeller on the other hand, can (if the speed is high enough), introduce loads sufficiently large to alter the bearing housing friction relative to the weight only values. The air test speed should therefore be as fast as possible to make the air torque and other loads as significant as possible in relation to the weight loads but not so fast as to introduce errors due to the dynamic out-of-balance.

Obviously, the optimum speed will vary with the size of the part and the balancing accuracy. The best speed will generally close to the normal maximum speed for the pump on a slurry service.

The pump 10 includes an inlet 3 and a test suction plate 2. Pump 10 also includes normal impeller, casing and other components (not shown), and an outlet 8. Pump 10 is driven using a V-belt or other driver 6 equipped with a Lebow or other type of accurate measuring strain gauge-type torque bar 7. At the inlet 3, an inlet piping arrangement is provided for suction of air into the pump. The piping arrangement includes an inlet pipe 4 and a feeding pipe 9. Between inlet pipe 4 and feeding pipe 9 is positioned a flow meter 5 that is used to accurately measure the flow rate of air to the pump. The flow meter could be a venturi meter, or some similarly accurate flow meter.

Torque bar 7 should be sized to transmit just the total torque values of power. For example, the torque bar could be sized so that it reads at no less than half scale or 250 or so micro-strain. For example, in the case of a test carried out on a 2.79 meter diameter pump this turned out to be a 38 mm diameter torque bar.

For a bearing house test in which the impeller is removed, a smaller torque-measuring bar should be used and sized to operate at no less than half full scale. For example, a 25 mm diameter torque bar was found to be satisfactory. A dummy weight designed to simulate part or all of the impeller weight is added to the shaft and a check is made that the friction does not vary by any measurable amount with different bearing housing radial load(s).

The above torque sensor size and minimum bearing housing size limitations are such that the method described herein is preferably used on large pumps, for example, pumps with impellers of 1.5 meters or larger and/or drawing 750 kW in service on water. The size of the motor 6 should be minimized in order to protect the torque measuring devices 7. However, the motor must be large enough to be able to overcome the higher startup torque observed when the bearing housing is cold. Minimization of the motor size may require helping the motor to start the impeller rotating, by hand or some other peripheral device prior to or during startup. The use of a variable frequency drive was found to be advantageous for the 1.5 mm impeller.

The value of air testing is that if it is carried out with sufficient accuracy, it makes proving pump performance less expensive and easier. The power necessary is reduced by the ratio of the density of water to air, or approximately $\frac{1}{800}$th of the power when pumping with water. In addition, air can be pumped from the surrounding atmosphere, therefore requiring less pipe work (and thus less test space). Due to the significant reduction in generated pressures, the pump plate and piping components can be lighter and less expensive.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of determining efficiency of a liquid pump using a gas test medium, comprising:

assembling a liquid pump comprising a housing, an impeller and an impeller shaft temporarily to a bearing housing comprising a bearing arrangement adapted to support the impeller shaft and a hydraulic load exerted by a gas medium introduced into the housing;

determining the pump output power based on gas flow through the pump at a predetermined speed and temperature;

determining a corrected pump input power based on gas flow through the pump with the impeller removed; and determining the pumping efficiency by dividing the output power by the corrected pump input power.

2. The method according to claim 1, wherein the determination of the corrected pump input power includes conducting an impeller test by driving the impeller shaft at a predetermined, substantially constant speed and circulating air through the pump, a suction pipe, a discharge pipe and suitable venturi or other pipe section.

3. The method according to claim 2, wherein the determination of the corrected pump input power includes heating and maintaining the temperature of the bearing housing at a predetermined temperature.

4. The method according to claim 3, wherein the determination of the corrected pump input power includes measuring torque on the impeller shaft over a range of gas flow rates and calculating input power from the torque required to rotate the impeller shaft.

5. The method according to claim 4, wherein the determination of the corrected pump input power includes:

removing the impeller from the shaft and loading the shaft with a weight to simulate the impeller;

driving the pump at substantially the same speed as the impeller speed during the impeller test; and measuring torque on the impeller shaft and calculating the power loss due to the bearing arrangement.

6. The method according to claim 5, wherein the determination of the corrected pump input power includes subtracting the bearing housing power from the total power, and multiplying the result by 1.01 to add back the normal bearing housing power and other losses associated with water to obtain the corrected input pump power.

7. The method according to claim 1 wherein the corrected input power is defined as $$P_{cor}=(P_{tot}-P_{brg})\times 101;$$

where $P_{tot}$ represents the total input power to the pump and $P_{brg}$ represents the power losses associated with the bearing housing.

8. The method according to claim 1 including flowing gas into the pump at a constant speed as for a normal water test, over a range of flows from 0% to approximately 160% of an expected BFPQ flow.

9. The method according to claim 1, including heating the bearing housing to a constant temperature of about 80° C.

10. The method according to claim 9, including controlling the temperature of the bearings to within 1–2° C.

11. The method according to claim 1, wherein the gas is air.

12. A method for determining the efficiency of a pump using air, comprising:

determining the total output power of the pump when pumping air at a rate of between 0 and 160% of an expected best efficiency quantity;

determining total input power required for a pump impeller to operate on air at a predetermined speed, temperature, and radial load;

determining a power loss attributed to a bearing housing that supports a shaft holding the pump impeller while the impeller is removed from the shaft;

subtracting the power loss from the bearing housing from the total power on air;

adding 1% of a net value back to obtain a corrected power input; and determining pump efficiency by dividing the output power by the corrected power.

13. An apparatus for determining efficiency of a liquid pumping arrangement using a gas test medium, comprising:

a pump for pumping liquid having an inlet and an outlet adapted to intake and expel said gas medium;

a bearing arrangement comprising a bearing housing, inside of which is maintained ball and/or roller bearings designed to support static dynamic loads on the pump when being tested using said gas medium;

a heating unit to heat and maintain the temperature of the bearing housing within a specified temperature range;

a flow meter to accurately measure the flow rate of said gas medium to the pump;

a drive unit and torque-measuring device adapted to drive the pump at a predetermined angular velocity and measure torque on an impeller shaft;

a control unit to store readings representing measured values obtained during pump operation, whereby the measured torque and the measured flow rate are used to determine power needed to drive an impeller using the gas medium, to determine power loses due to said housing and to determine the output in order to measure pump efficiency of said liquid pump.

14. The apparatus according to claim 13, wherein the gas is air.

* * * * *